June 26, 1962 R. C. BERRY ET AL 3,041,420

PLUG AND RECEPTACLE UNIT

Filed Sept. 29, 1958 8 Sheets-Sheet 1

INVENTORS
Richard C. Berry
Howard J. Stier

BY

D. Emmett Thompson

ATTORNEY

June 26, 1962 R. C. BERRY ET AL 3,041,420

PLUG AND RECEPTACLE UNIT

Filed Sept. 29, 1958 8 Sheets-Sheet 2

INVENTORS
Richard C. Berry
Howard J. Stier

BY

D. Emmett Thompson

ATTORNEY

June 26, 1962 R. C. BERRY ET AL 3,041,420

PLUG AND RECEPTACLE UNIT

Filed Sept. 29, 1958 8 Sheets-Sheet 3

INVENTORS
Richard C. Berry
Howard J. Stier

BY

D. Emmett Thompson

ATTORNEY

June 26, 1962 R. C. BERRY ET AL 3,041,420

PLUG AND RECEPTACLE UNIT

Filed Sept. 29, 1958 8 Sheets-Sheet 4

INVENTORS
Richard C. Berry
Howard J. Stier

BY

D. Emmett Thompson

ATTORNEY

June 26, 1962 R. C. BERRY ET AL 3,041,420

PLUG AND RECEPTACLE UNIT

Filed Sept. 29, 1958 8 Sheets-Sheet 5

INVENTORS
Richard C. Berry
Howard J. Stier

BY

D. Emmett Thompson

ATTORNEY

June 26, 1962 R. C. BERRY ET AL 3,041,420

PLUG AND RECEPTACLE UNIT

Filed Sept. 29, 1958 8 Sheets-Sheet 6

INVENTORS
Richard C. Berry
Howard J. Stier

BY

D. Emmett Thompson
ATTORNEY

INVENTORS
Richard C. Berry
Howard J. Stier
BY
D. Emmett Thompson
ATTORNEY

June 26, 1962

R. C. BERRY ET AL 3,041,420

PLUG AND RECEPTACLE UNIT

Filed Sept. 29, 1958

8 Sheets-Sheet 8

INVENTORS
Richard C. Berry
Howard J. Stier

BY

D. Emmett Thompson

ATTORNEY

United States Patent Office 3,041,420
Patented June 26, 1962

3,041,420

PLUG AND RECEPTACLE UNIT

Richard C. Berry, Camillus, and Howard J. Stier, North Syracuse, N.Y., assignors to Crouse-Hinds Company, Syracuse, N.Y., a corporation of New York Filed Sept. 29, 1958, Ser. No. 764,064
14 Claims. (Cl. 200—50)

This invention relates to an electrical plug and receptacle connecting unit for use in hazardous atmospheres. The unit is particularly adapted for carrying heavy power loads and embodies a switching arrangement having contacts separate from the plug and receptacle contacts for opening and closing the circuit.

For example, the plug and receptacle unit of our invention is used advantageously on or at the runway aprons of airports for the servicing of large aircraft by way of providing power to provide for lights, generator operation, air conditioning equipment and the like on the planes while they are idle on the runway. The voltage and current requirements necessary to supply the adequate power to large aircraft are relatively high. Generally, the power supply is at 400 volts—200 amperes.

Because of the refueling of the planes on the runway apron, there exists a hazardous situation particularly in the refueling of jet propelled aircraft. Accordingly, the components making up the electrical supply are of the explosion proof type. Heretofore, it has been customary to connect these circuits to a source of power at a point quite remote from the runway apron. This necessitates a costly installation and the hazard exists that, for one cause or another, the plug and receptacle units may become separated while the system is carrying the heavy power load, resulting in the creation of considerable arcing in the hazardous atmosphere.

This invention has as a general object a plug and receptacle unit of new and improved construction capable of carrying the large power load and embodying a switching arrangement mounted within an explosion proof compartment in the receptacle portion of the unit for making and interrupting the power supply to the plug contacts, the switching arrangement being incapable of being operated to closed positions until after proper insertion of the plug into the receptacle and for interlocking the plug and receptacle, whereby to prevent withdrawal of the plug from the receptacle until after the switching mechanism has been actuated to open position.

The invention has as a further object a structural arrangement as referred to wherein the plug is provided with means for actuating the switch mechanism, whereby the switch mechanism cannot be operated to closed position by ordinary tools, or implements.

The invention has as a further object a new and improved contact and wiring terminal.

The invention consists in the novel features and in the combinations and constructions hereinafter set forth and claimed.

In describing this invention, reference is had to the accompanying drawings in which like characters designate corresponding parts in all the views.

In the drawings—

Briefly described the invention comprises a housing having a switch and receptacle unit mounted therein. The switch and receptacle unit is adapted to receive a plug in electrical engagement. The plug carries operating apparatus for actuating the switch contacts of the unit, and is so constructed that the switch cannot be operated unless the plug is fully inserted in the receptacle and the plug cannot be disengaged from the receptacle until the switch has been moved to its off position. Means are carried in the plug to indicate when the switch is in the on or off position and to prevent inadvertent switching of the unit.

Figure 1:
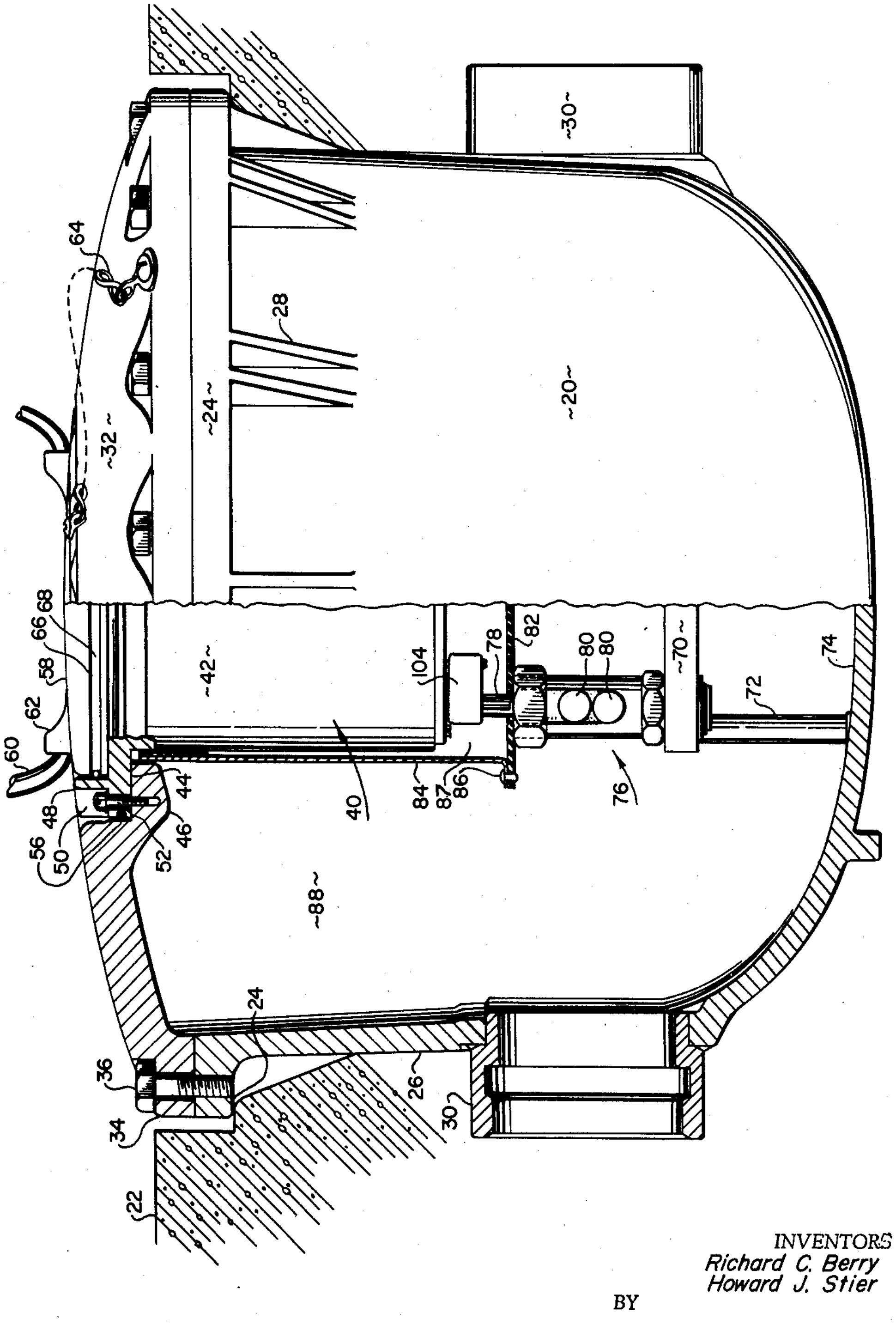
FIGURE 1 is an elevational view of the receptacle with parts broken away and parts in section.

Referring to FIGURE 1, a housing 20 has been shown as being mounted in what may be an airport runway apron 22 or the like. It is to be understood that the housing 20 may be mounted by any suitable means in any desired location.

The housing 20 is cylindrical in cross section and terminates in an outwardly extending annular flange or shoulder 24 supported on the side wall 26 of the housing by a plurality of external triangular ribs 28, the ribs 28 extending about the entire periphery of the side wall 26. The housing 20 is provided with a plurality of hubs 30 to receive wire carrying metallic conduits or the like (not shown) which supply and furinish the power lines to the interior of the housing 20.

The housing 20 is provided with a dome shaped cover 32 formed with an annular flange 34 of a dimension co-extensive with the shoulder 24 formed in the housing 20, and a plurality of bolts 36 serve to affix the flanges 34 and 24 together in order to fixedly mount the cover 32 on the housing 20. A combination switch and receptacle unit, generally indicated at 40 is mounted in a central aperture formed in the cover 32. The unit 40 includes the cylindrical external body 42 which terminates at its upper end in an annular external flange 44 which is received in and supported by the shoulder 46 formed in the aperture in the cover 32. The flange 44 is provided with an annular strengthening rib 48 which is recessed at a plurality of points about the periphery of the flange 44, as is indicated at 50. A plurality of bolts 52 are received in the recesses 50 and serve to affix the unit 40 in the cover 32 on the housing 20. The external outer surface of the flange 44 is provided with an annular groove in which a gasket such as an O-ring 56 is received to mount the unit 40 in moisture proof fashion in the cover 32.

As shown in FIGURE 1, the unit 40 is open at its upper end and a weather cap 58 is mounted in the open end of the unit 40 to effectively seal the unit 40 from the atmosphere when a plug is not received in the unit 40. The weather cap 58 includes the bail handle 60 received in the lugs 62 formed in the cap 58 and is provided with a chain 64 which connects the cap 58 to the cover 32 to prevent inadvertent misplacing of the cap 58 when it has been removed from the unit 40. The cap 58 is provided with an external annular groove 66 in which an O-ring gasket 68 is received to mount the cap 58 in the unit 40 in weather-tight fashion.

The housing 20 is provided with an insulating platform 70 supported by a plurality of posts 72 on the bottom wall 74 of the housing. A plurality of wiring terminals, generally indicated at 76, are mounted on the insulating platform 70 and terminate in prong, or male-type, contacts 78. As viewed in FIGURE 1, the terminal 76 has been shown as receiving a pair of power cables 80 which enter the housing 20 through one of the conduit hubs 30 to furnish the unit 40 with power from an external power supply. A plurality of such terminals 76 and contacts 78 are mounted in the platform 70 and are shown in the drawings as comprising five (5) in number. It is to be understood, however, that as many, or as few terminals and contacts may be provided as are desirable or necessary to meet the power transmission requirements of the unit.

A cylinder comprising a bottom wall 82 which is provided with a number of apertures corresponding to the number of contacts 78 is supported on the terminals 76 and has an upwardly extending cylindrical side wall 84, affixed thereto by means of rivets 86. The bottom wall 82 and side wall 84 provide a compartment 87 in which the unit 40 is received and through which the contacts 78 enter the unit 40 in a manner to be hereinafter described. The bottom wall 82 which is formed of insulating material and side wall 84 effectively seal the unit 40 from the interior of the housing 20 and the compartment 88 thus formed in the interior of the housing 20 may be filled with a suitable sealing compound (not shown) introduced into the compartment 88 through a plug or the like (not shown) in the cover 32, the sealing compound serving to render the terminals 76 and the interior of the housing 20 moisture proof.

Figure 6:
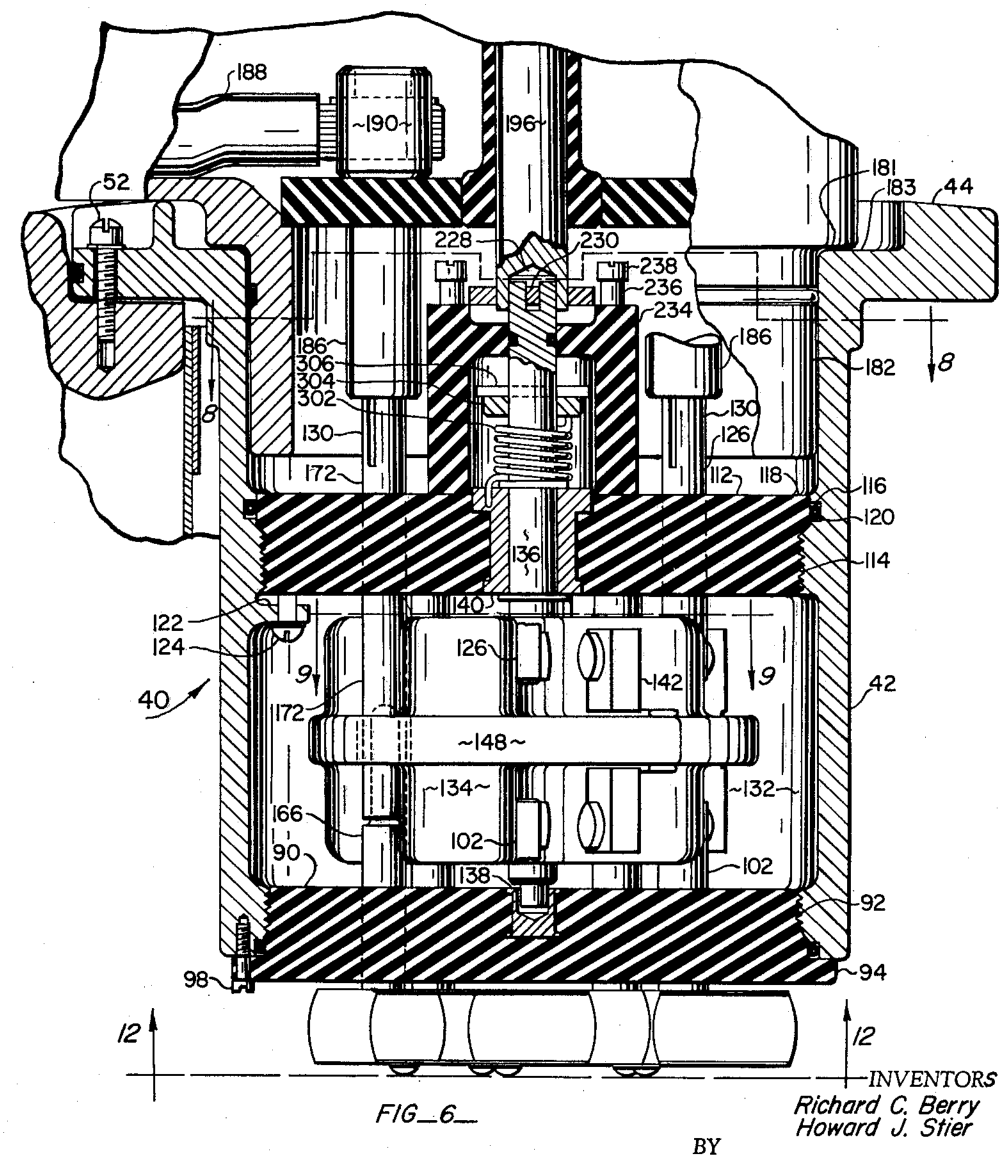
FIGURE 6 is an elevational view of the plug and receptacle with parts broken away and parts in section.
Figure 12:
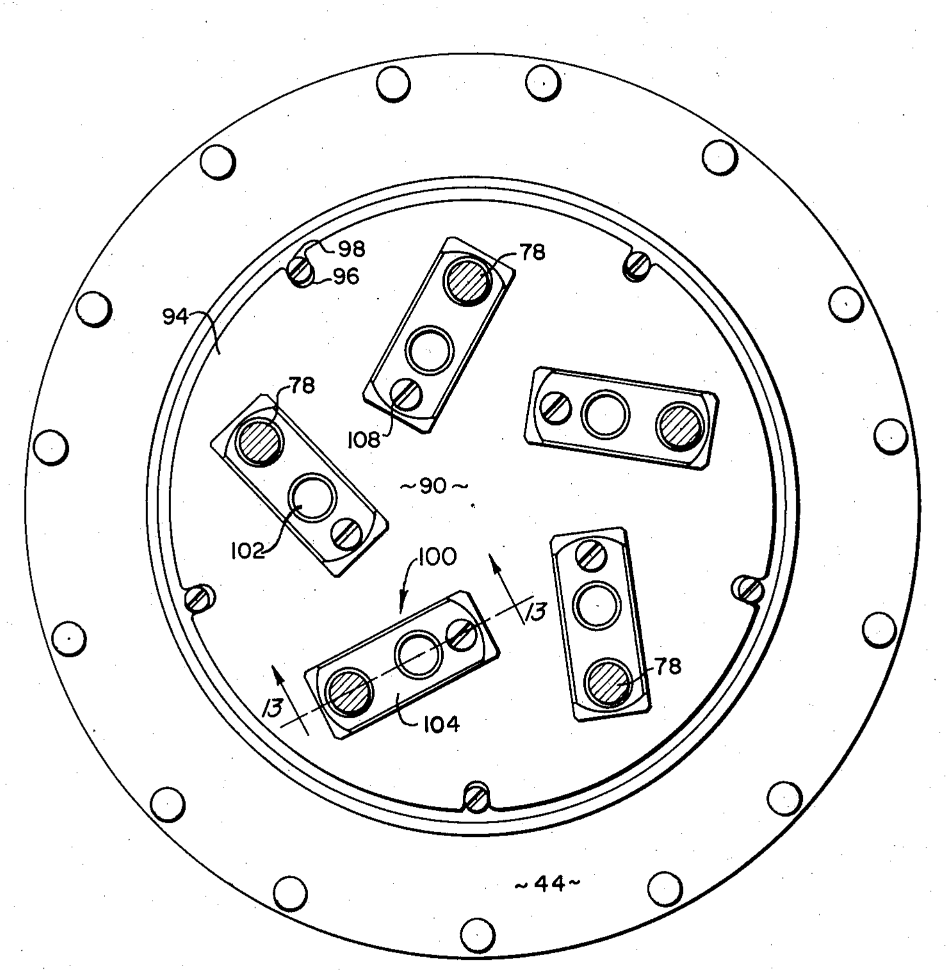
FIGURE 12 is a bottom plan view taken on the line 12—12 of FIGURE 6.

Referring now to FIGURE 6, the unit 40 has been shown in detail and comprises the cylinder 42 provided with an insulating partition 90 threadedly mounted in the lower end of the cylinder 42. The threaded joint 92 between the cylinder and the partitions may be made sufficiently long to render the joint flame tight, and as seen in FIGURES 6 and 12, the partition 90 terminates in an outwardly extending flange 94 positioned beneath the cylinder wall 42. The partition 90 is formed with a plurality of notches 96 about the periphery of the flange 94. A plurality of bolts 98 are received in the notches 96 of the flange 94 and serve to fix the partition 90 against rotation in the cylinder 42.

Figure 13:
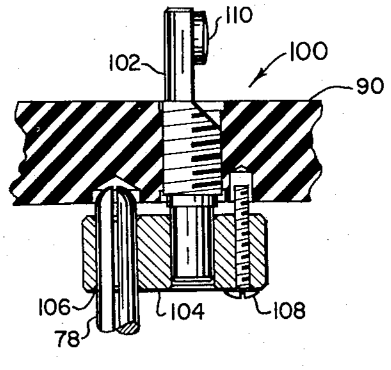
FIGURE 13 is a fragmentary cross-sectional view taken on line 13—13 of FIGURE 12.

A plurality of second or bridging contacts, generally indicated at 100 (see FIGURE 13) are positioned in and extend through the partition 90 and are spaced approximately complementally to the contacts 78 mounted in the terminals 76 on platform 70.

The assembly 100 comprises the bridging contact post 102 which extends through the partition 90 and is suitably fixedly mounted therein by threads, or the like. The lower or outer end of the post 102 is suitably affixed by welding or the like, to an electrically conductive block 104 which is suitably apertured, as at 106 to receive the contacts 78. Block 104 and post 102 are fixed against angular displacement in the partition 90 by means of the screw 108 extending through the block 104 and into an aperture formed in the partition 90. The post 102 terminates at its inner or upper end in a contact pad or button 110.

Returning now to FIGURE 6, it will be seen that the cylinder 42 of the unit 40 is provided intermediate its ends with a second partition 112 formed of suitable insulating material threadedly mounted in the interior of the cylinder 42. The threaded joint 114 between the partition 112 and the cylinder 42 may be made sufficiently long to be flame proof. The cylinder 42 is provided with an annular groove or recess 116 adjacent the annular shoulder 118 formed on the upper end of the partition 112 and a gasket or O-ring 120 is received in the groove 116 to make the joint between the partition 112 and the cylinder 42 moisture proof. The cylinder 42 is formed with a plurality of radially inwardly extending bosses 122 and screws 124 are threadedly received through the bosses 122 to engage the partition 112 to fix the partition against rotation in the cylinder 42.

A plurality of fourth or receptacle contacts 126 are fixedly mounted in the upper partition 112 in any suitable manner such as by molding, or the like. The contacts 126 are equal in number to the contacts 78 and 102 and are positioned in axial alignment with the contacts 102. The contacts 126 terminate at their inner end in a contact pad or button 128 and at their outer end in a pair of prongs 130 to form male-type receptacle contacts.

Within the compartment 132 formed by the partitions 90 and 112 means are provided for connecting the bridging contacts 102 in circuit with the receptacle contacts 126. As best seen in FIGURES 6, 7, 9 and 10 and 11, this means comprises a switch block 134 molded to, or otherwise suitably affixed to shaft 136. The shaft 136 is journaled at its inner end in a pilot bearing 138 carried by the partition 90 and the shaft 136 extends upwardly through a sleeve bearing 140 fixedly mounted in the partition 112.

The block 134 is made up of any suitable insulating material and carries a plurality of switch contact bars 142 in the following manner. The block 134 is cylindrical in outline and is provided with a plurality of upper and lower recesses 144 separated from each other by a plurality of radial barriers or ribs 146. The recesses 144 on top and bottom of the block 134 are separated by a central radially extending circumferential barrier 148. A plurality of polygonal apertures 150 are formed in the barrier 148 to receive the contact bars 142. Each of the contact bars 142 is inserted in the apertures 150 in the manner shown in the dash lines in FIGURE 9.

Figure 11:
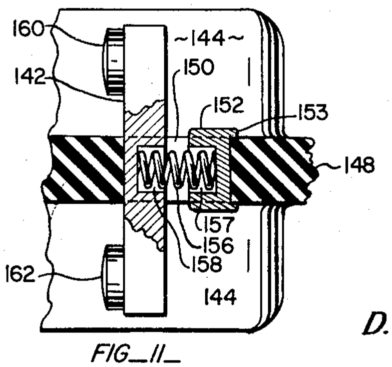
FIGURE 11 is a fragmentary section taken on line 11—11 of FIGURE 9.

After insertion of the contact bar 142 in the aperture 150 a contact spacer 152 provided with a pair of lips 153 is mounted in the aperture 150 on the barrier 148 so as to removably affix the spacer 152 in the aperture 150 (see FIGURE 11). A compression spring 156 is mounted between a recess 157 formed in the front of the spacer 152 and a recess 158 which is formed in the center of the contact bar 142 and opens rearwardly to confront the recess 157 in the spacer 152 in a manner whereby the spring 156 yieldably urges the contact bar 142 to its forward position in the aperture 150. The bars 142 are formed with upper and lower contact buttons or pads 160 and 162 which align with the contact pads 110 and 128 formed on the contacts 102 and 126 respectively in an opposed confronting relation in a manner whereby upon rotation or oscillation of the block 134 in a clockwise manner, as viewed in FIGURE 9, the bars 142 and the pads 160 and 162 will be urged into engagement with the respective pads 128 and 110 by reason of the compression spring 156 to electrically connect the bridging contacts 102 to the receptacle contacts 126 through the switch contact bars 142.

Figures 9, 10:
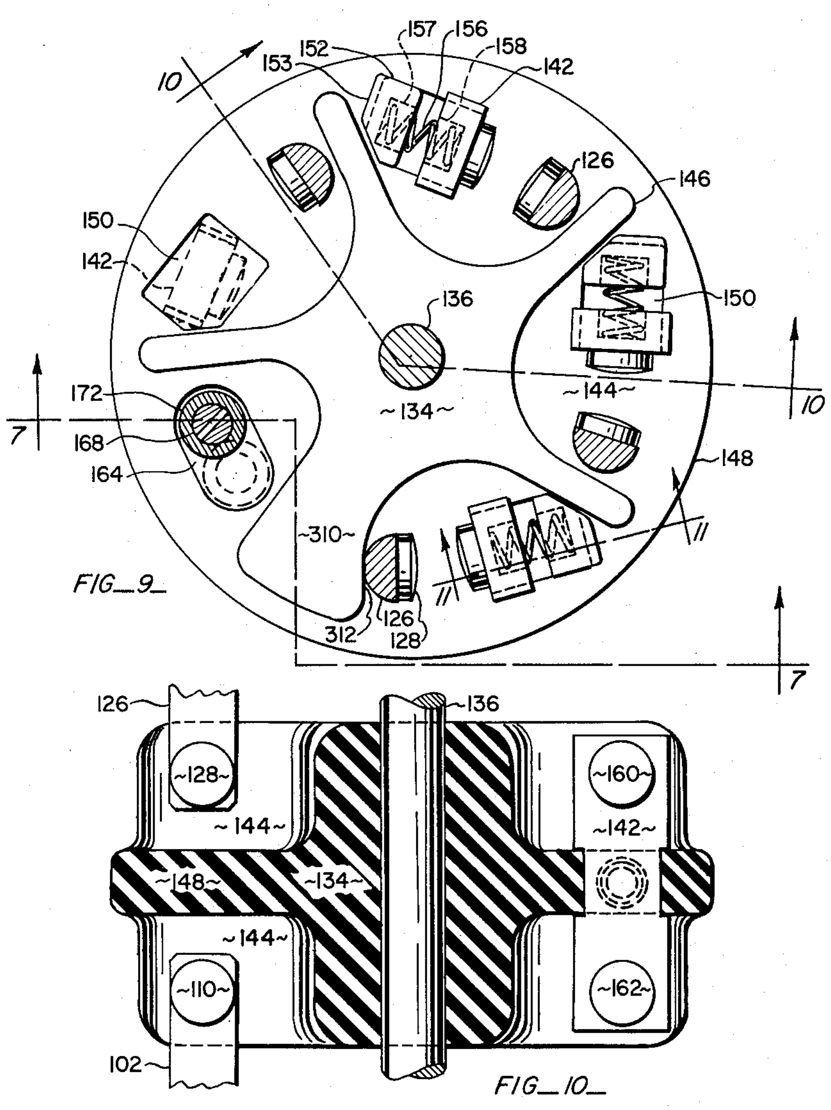
FIGURE 9 is a top plan view of an element of the invention.
FIGURE 10 is a sectional view taken on line 10—10 of FIGURE 9.

As seen in FIGURE 9, four (4) apertures 150 and barriers 146 are provided in the block 134. A fifth (5th) aperture of oblong shape 164 is formed in the barrier 148 for a purpose to be described in connection with FIG- URES 6, 7 and 9. A special ground contact 166 is mounted in the partition 90 and extends upwardly through the lower recess 144 in the block 134 through the aperture 164 and into the upper recess 144 formed on the block 134. The contact 166 is formed with prong fingers 168 which are received in the aperture 170 formed in the upper grounding receptacle contact 172 which extends through and is suitably mounted in the upper partition 112. The contact 172 terminates adjacent its upper end in prongs 130 similar to the prongs formed on the contacts 126. The aperture 164 is of sufficient circumferential length to permit the block 134 to be oscillated from the position where the contacts 166 and 172 are shown in engagement in solid lines in FIGURE 9 to the position shown in the dash lines. As will be obvious when the unit is assembled the grounding contacts 166 and 172 are aligned by reason of polarizing lugs and grooves formed on the plug and unit 40 and are connected in electrical engagement by inserting the prongs 168 in the aperture 170 so as to connect the ground contacts at all times regardless of the position of the block 134 and the line contacts 102, 142 and 126.

Figure 7:
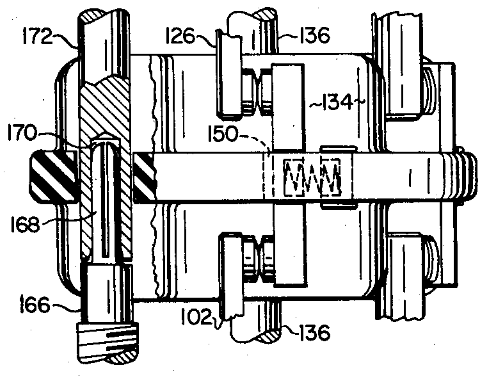
FIGURE 7 is a fragmentary elevational view of the switch mechanism similar to FIGURE 6 taken approximately on line 7—7 of FIGURE 9, with the switch contacts closed.

When the shaft 136 to which the block 134 is affixed is rotated the switch contact bars 142 will rotate with the block 134 from the open or "off" position, shown in FIGURES 6 and 9, to the closed or "on" position, shown in FIGURE 7, thereby connecting the receptacle contacts 126 in circuit with the fixed contacts 78 through the bridging contact assembly 100 and the switch contacts 142.

Figure 2:
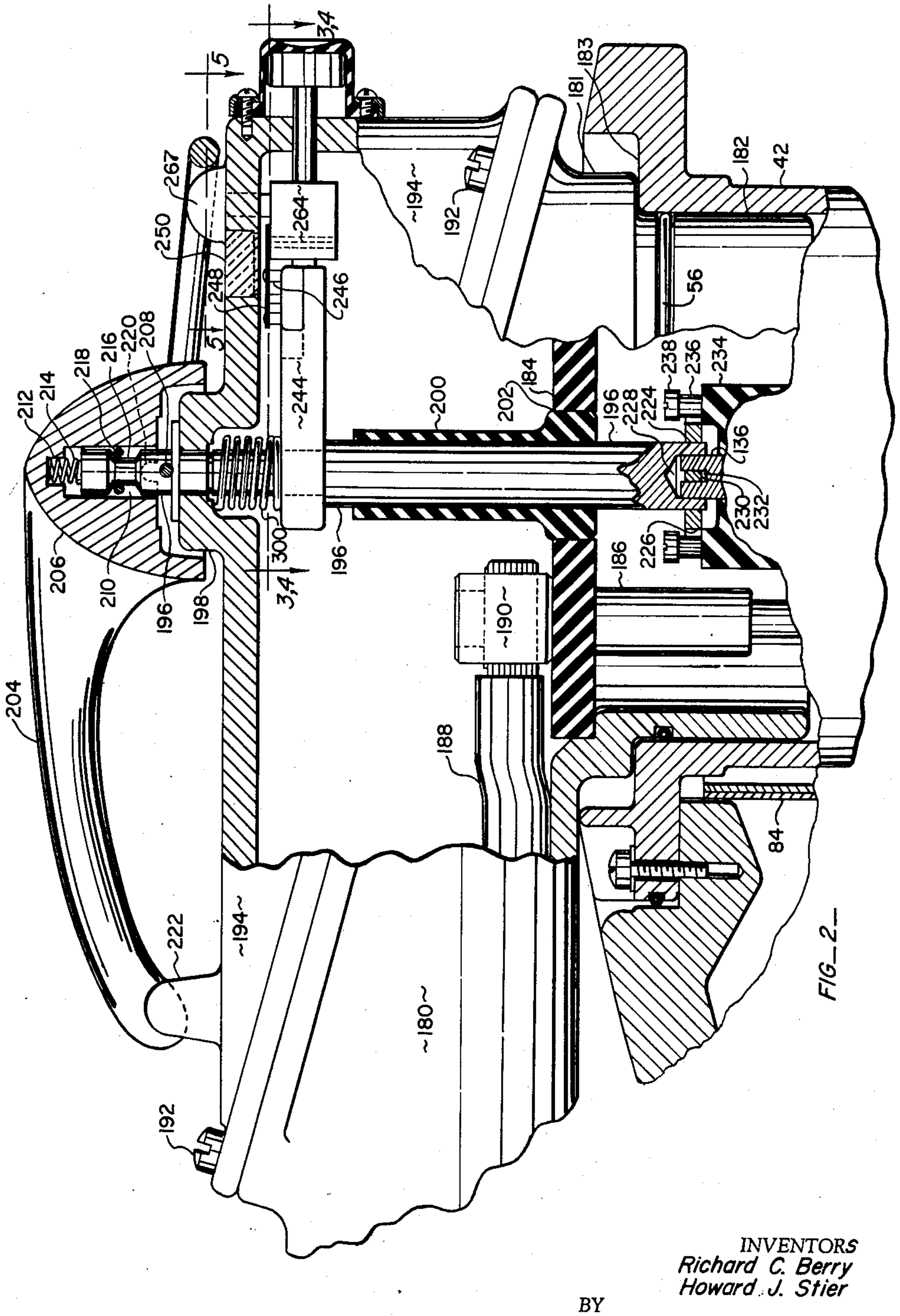
FIGURE 2 is an elevational view with parts broken away and parts in section, of the top portion of the receptacle and the plug inserted in the receptacle.

Referring now to the FIGURES 2, 3, 4 and 5, a plug composed of a plug body 180 which is formed with a depending cylindrical shoulder 181 and a skirt 182 of a diameter complemental to the internal diameter of the upper open end of the cylinder 42 to be received therein with the plug shoulder 181 resting on a shoulder 183 formed in the open end of the cylinder 42. An insulating block 184 is carried in the body 180 to support a plurality of plug contacts of the female type 186, said contacts being equal in number to the male-type receptacle contacts 126 and spaced complementally and in axial alignment therewith. As shown in FIGURE 2, each of the plug contacts 186 is connected by any suitable means to power cable 188 through a wiring terminal 190.

Figure 8:
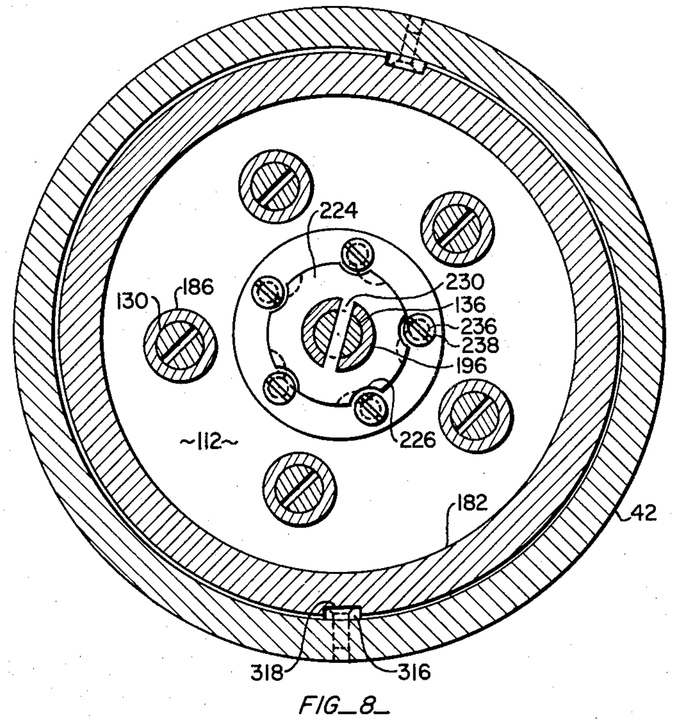
FIGURE 8 is a view taken on the line 8—8 of FIGURE 6.

Mounted on the plug body 180 by means of a plurality of fasteners 192 is a plug cover 194. An operating shaft 196 is mounted in a boss 198 formed centrally of the cover 194 and extends axially downward from the cover 194 centrally of the plug contacts 186 carried by the plug body 180. An insulating bearing sleeve 200 is suitably affixed to shaft 196 and positions the shaft 196 in an aperture 202 formed in the block 184. As shown in FIGURE 2 the upper end of the shaft 196 is mounted in a handle 204 formed with a central hub 206. Shaft 196 is formed with a pin 208 extending transversely therethrough, and the hub 206 is provided with a center aperture or bore 210 in which the upper end of the shaft 196 is received. The bore 210 is formed at its upper end with a countersink 212 and a compression spring 214 is positioned in the countersink 212 to urge the hub 206 of the handle upwardly on the shaft 196. The shaft 196 is formed adjacent its upper end with a reduced portion 216 and a pair of pins 218 extend through the hub and into the space between the bore 210 and the shaft 196 formed by the reduced portion 216, the pins 218 serving to limit the axial movement of the hub 206 on the shaft 196. The lower end of the hub 206 is formed with a pair of notches 220 which are coextensive with the transverse pin 208 in the shaft 196. When the hub and handle are urged downwardly on the shaft 196 against the action of the spring 214, the pin 208 is received in the notches 220 so as to provide a driving engagement between shaft 196 and the handle 204 to permit the handle to rotate the shaft 196. Upon removal of pressure from the handle 204 the spring 214 urges the hub 206 and the handle 204 upwardly on the shaft 196 to a position where the handle is no longer in driving engagement with the shaft 196 and is free to rotate on the shaft. As will be therefore obvious the shaft 196 cannot be rotated by the handle 204 accidentally or inadvertently since it is necessary to urge the hub 206 downwardly to a position where the pin 208 is received in the notches 220. The free motion of the handle 204 may be limited if desired by forming a pair of lugs or bosses 222 on the exterior of the cover 194. The shaft 196 carried by the plug cover 194 is formed on its lower or inner end with a plate 224 provided about its periphery with a plurality of notches 226 (see FIGURE 8). The lower end of the shaft 196 has a bore 228 and the plate 224 which is formed with a cross bar 230 which extends through the bore 228 and across the lower end of the shaft 196.

Referring to FIGURES 2 and 6 the upper end of the shaft 136 is formed with a notch 232 of a dimension complemental to the cross bar 230 formed on the plate 224 whereby the cross bar 230 may be received in the notch 232 when the plug is inserted in the switch and receptacle unit 40. The shaft 136 is journaled in and surrounded by an insulating cap 234 fixed by any suitable means to the insulating partition 112 and the cap 234 is provided at its upper end with a plurality of headed screws 236 which correspond in number to the notches 226 formed on the plate 224 wereby the heads 238 of the screws 236 are of such dimension to necessitate the alignment of the notches 226 with the heads 238 in order to insert the plug in the switch and receptacle unit. The radius of the plate 224 is less than the radial distance between the center of the cap 234 and the diameter of the screws 236 whereby after insertion of the plug to the position where the notches 226 have cleared and passed the screw heads 238, see FIGURE 6, the plate 224 may be rotated under the heads 238 to the "on" position as shown in the dash lines in FIGURE 8. It will, therefore, be obvious that a driving connection is effected in the manner just described between the shaft 196 and the shaft 136 whereby upon rotation of the handle 204 and the shaft 196 in the manner previously described the shaft 136 will be rotated to move the switch contact bars 142 into engagement with the bridging contacts 102 and the receptacle contacts 126.

As will be obvious the interfering fit between the notches 226 on the plate 224 and the heads 238 of the screws 236 carried by the cap 234 prevent the plug from being removed from the switch unit 40 until the shaft 196 has been rotated to the "off" position at which point the notches 226 are in axial alignment with the heads 238. When the shaft 196 is rotated to effect this alignment the shaft 136 is also in turn rotated to move the block 134 to the "off" position wherein the switch contact bars 142 are separated from the contacts 102 and 126. Therefore, it will be apparent that the plug cannot be removed from the unit 40 until the switch has been returned to the "off" position thereby eliminating the possibility of any arcing occurring between the plug and receptacle contacts being exposed to any explosive atmosphere.

Figure 5:
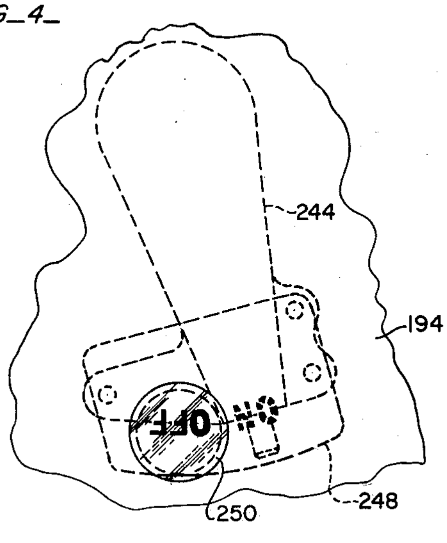
FIGURE 5 is a view looking in the direction of line 5—5, FIGURE 2.

Mounted on the upper end of the shaft 196 by means of a square aperture, or the like, on a squared portion of the shaft 196, is a latching arm 244 which extends radially outwardly from the shaft 196. Mounted on the outer end of the arm 244 by means of screws 246, or the like, is an indicating plate 248. As best seen in FIGURE 5, the indicating plate has formed thereon the words "on" and "off," and the arm 244 is shown mounted on the shaft 196 so as to position the word "off" beneath an indicating window 250 mounted in the plug cover 194 when the switch unit 40 is in the "off" position. Correspondingly, the word "on" will be positioned beneath the window 250 when the switch is in the "on" position whereby an operator may readily observe the position of the unit merely by referring to the window 250.

When the shaft 196 is rotated to in turn rotate the shaft 136 to connect the contacts 102 and 126 in circuit through the switch contact bars 142, the arm 224, by reason of the connections just described, is also rotated. Carried in the outer end of this arm 224 and extending radially outwardly therefrom is a spring loaded latch pin 260. Pin 260 is urged outwardly in the arm 244 by means of a compression spring 262 carried in the arm 244. Adjacent the outer end of the arm 244 a latch block 264 is mounted on and depends from the plug cover 194 by means of threaded fasteners 266, or the like, which are received in bosses 267 formed on the exterior of the cover 194.

Figure 4:
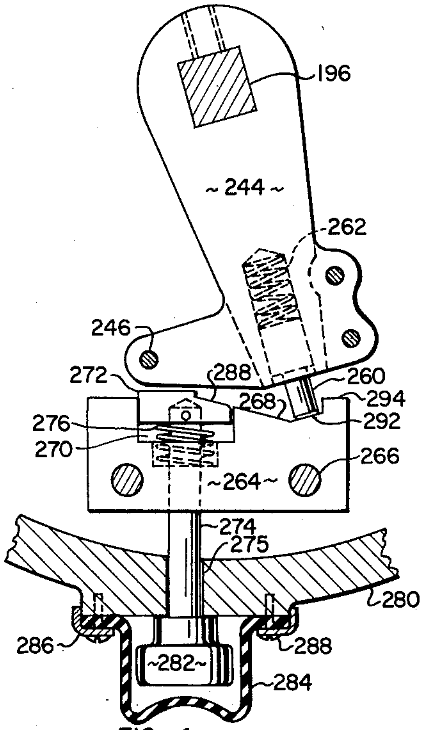
FIGURE 4 is a view similar to FIGURE 3 with the switch shown in unlatched position.

Block 264 is formed on its radially inner surface with a cam surface 268 on which the pin 260 is positioned when the arm 244 and shaft 196 are in the "off" position as best seen in FIGURE 4.

Figure 3:
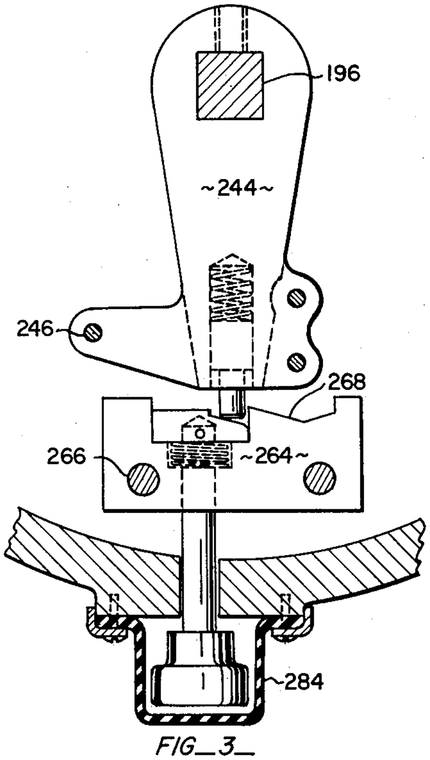
FIGURE 3 is a fragmentary sectional view taken on the line 3—3 of FIGURE 2 illustrating the switch latch in latched position.

The block 264 is formed with a notch 270 adjacent the end of the cam track 268 and a release block 272 is mounted in the notch 270 on the end of a shaft 274. The notch 270 is counterbored to receive a compression spring 276 which normally urges the shaft 274 and block 272 radially inwardly toward the shaft 196. The shaft 274 extends outwardly through an aperture 275 formed in the side wall 280 of the cover 194 and terminates in a thickened or button portion 282. The button 282 is enclosed in a rubber weather cap 284 which is affixed to the side wall 280 by means of an annular clamping ring 286 and screws 288 whereby the aperture 275 formed in the wall 280 to receive the shaft 274 will be effectively sealed against the entrance of moisture, or the like, into the cover. When the shaft 196 is rotated to the "on" position the pin 260 will move along the cam track 268 to the end thereof and into engagement with the release block 272 which has a portion 288 formed thereon with a cam surface complemental to that of the cam track 268. The pin 260 under the influence of spring 262 which is stronger than spring 276 wil urge the block 272 and shaft 274 radially outwardly against the action of the spring 276 whereby the shaft 196 will be locked in the "on" position as shown in FIGURE 3. When it is desired to release the arm 244 for movement to the "off" position the button 282 is depressed to move the pin 260 inwardly to the point where the surface 288 on the block 272 is in alignment with the cam track 268 on the latch block 264 at which point the arm 244 and pin 260 may be moved counter-clockwise as viewed in FIGURES 3 and 4, to the "off" position shown in FIGURE 4. As seen in FIGURE 4 the cam track 268 terminates in its inner end in an oppositely sloped portion 292 which portion receives the pin 260 in the "off" position and the block 264 is formed with a radially inwardly extending ear 294 which limits the counter-clockwise movement of the pin 260 and the arm 244.

The means for automatically returning the arm 244 and the shaft 196 from the "on" position shown in FIGURE 3 to the "off" position shown in FIGURE 4 comprises a pair of torsion springs. The first torsion spring 300 surrounds shaft 196 and is mounted in the plug cover 194 between the boss 198 and the arm 244 in a conventional manner to urge shaft 196 counter-clockwise as viewed in FIGURES 3, 4 and 5. The second torsion spring 302 is mounted about the shaft 136 in the cap 234 to urge shaft 136 in the same direction. Spring 302 is formed with a tang received in the bearing 140 shown in FIGURE 6, and a tang received in a retaining ring 304, the ring 304 being retained on the shaft 136 by means of a pin 306 extending transversely through the shaft 136 and a pair of radial notches or grooves formed in the upper surface of the ring 304. As will be obvious when the shafts 196 and 136 are in driving engagement, as previously described, and are rotated to the "on" position, the springs 300 and 302 will be wound up or loaded so that when the arm 244 is released, as described in connection with FIGURES 3 and 4, the springs 300 and 302 will cause the shafts 136 and 196 to be rotated in a counter-clockwise position, as viewed in FIGURES 3 and 4, to the "off" position thus effecting a quick break between the contacts carried by the switch bars 142 and the fixed contacts 102 and 126 to minimize the arcing occurring in the unit. The counter-clockwise movement of the shafts is limited in a manner to be now described.

Referring to FIGURE 9 it will be seen that a thickened barrier 310 is provided adjacent the ground aperture 164 in the contact block 134. The barrier 310 serves to provide a striking surface 312 for one pair of the contacts 102, 126 whereby when the arm 244 is released from the position shown in FIGURE 3 and the springs 300 and 302 cause the shafts 196 and 136 to rotate counter-clockwise as viewed in FIGURE 9 the block 134 will strike the contacts 126 and 102 at surface 312 provided by the barrier 310 to limit counter-clockwise movement of the block 134. The remaining barriers 146 on the block 134 are so formed as to provide a clearance between the barrier 146 and the respective contacts 126 and 102 when the switch is in the "off" position as best seen in FIGURE 9.

It will be obvious from the foregoing the operation of the invention is as follows. The female plug contacts 186 are aligned with the male receptacle contacts 126 carried in the unit 40 and the notches 226 in the plate 224 are similarly aligned with the heads 238 of the screws 236 by reason of polarizing lugs 316 (see FIGURE 8) formed on the inner surface of the cylinder 42 which cooperates with the grooves 318 formed in the plug skirt 182 whereby the plug may be inserted in the unit 40 to connect the contacts 186 and 126 in electrical engagement and to provide a driving connection between the shaft 196 and the shaft 136 as previously described. Thereafter the handle 204 is urged downwardly to rotate the shaft 196 and in turn the shaft 136, this rotation being imparted to the contact block 134 which is affixed to the shaft 136. When the block 134 is rotated the switch contact bars 142 carried by the block are moved into engagement with the fixed contacts 126 and 102 which enter the recesses 144 formed in the top and bottom surface of the block 134 whereby the switch contact bars 142 connect the fixed receptacle contacts 126 in circuit with the fixed bridging contacts 102. In this position the contacts 78 carried by the platform 70 in the bottom of the housing 20 are connected in circuit with the plug contacts 186 through the bridging contacts 102, switch contacts 142, and receptacle contacts 126. The interfering fit between the plate 224 and the heads 238 of the screws 236 prevents removal of the plug from the unit 40 until the shafts 196 and 136 have been rotated to the "off" position. This rotation is effected by releasing the latch mechanism by pushing the button 282 enclosed in the weather cap 284. The torsion springs 300 and 302 effect a rotation of the shafts 136 and 196 to the position where the surface 312 of the barrier 310 on the block 134 strikes one pair of contacts 102 and 126 at which point the notches 226 in the plate 224 are realigned with the screw heads 238 to permit removal of the plug from the unit 40. As will be obvious switching from the "on" to the "off" position takes place within the enclosure or the compartment 132 formed by the upper and lower partitions 112 and 90 respectively whereby no arc occurring within the compartment 132 may reach atmosphere to cause an explosion if the unit is located in a hazardous atmosphere. This explosion proof feature being achieved by reason of the threaded joints 92 and 114 between the partitions 90 and 112 and the cylinder 42 which joints may be of sufficient length to be flame quenching or flame proof, as is well known in the art.

Figure 14:
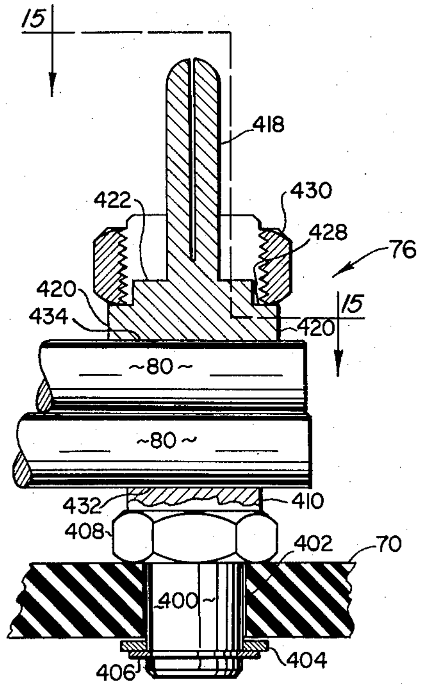
FIGURE 14 is an elevational view of a portion of the invention with parts broken away and parts in section.
Figure 15:
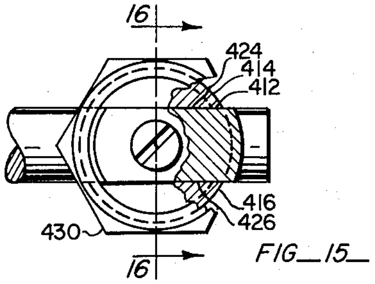
FIGURE 15 is a view taken on line 15—15 of FIGURE 14.
Figure 16:
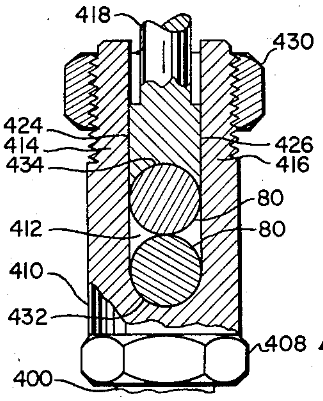
FIGURE 16 is a sectional view taken on line 16—16 of FIGURE 15.

Referring now to FIGURES 14 and 15 and 16, the jack type terminal assembly 76 and the means for mounting the same in the platform 70 will be described. The terminal comprises a shaft having a reduced portion 400 mounted in an aperture 402 formed in the platform 70.

A washer 404 is carried on the lower end 400 by means of a snap ring 406. The upper end of the portion 400 is formed with a hexagonal head 408 which is supported on the upper surface of the platform 70. A shank portion 410 threaded at its upper end, is connected to and extends upwardly from the hexagonal head 408. The shank portion 410 is axially slotted or bifurcated, as at 412, to form a pair of upstanding portions 414 and 416. A jack or prong type connector conductor formed with a pair of prong fingers 418 is mounted for sliding axial movement in the bifurcation 412 formed in the shank 410. The connector is formed with a pair of radially outwardly extending ears 420 on a cylindrical center portion 422 formed with flattened sides 424 and 426 which ride in and are guided by the inner surface of portions 414 and 416 formed by the bifurcation 412. The ears 420 form in conjunction with the portion 422, a shoulder surface 428 which is contacted by and moved by a hexagonal clamping nut 430 mounted on the threaded fingers 414 and 416. The undersurface of the nut 430 rides on the surface 428 to center the connector in the shank 410 and to move it downwardly into clamping engagement with a pair of electrical power cables 80. The lower end of the bifurcation 412 is formed with a curved surface 432 which cooperates with a curved undersurface 434 on the portion 420 of the connector to clamp the cables 80 therebetween when the nut 430 is rotated into engagement with the shoulder surface 426. As will be obvious with the terminal assembly 76, as just described, it is simple and convenient to removably clamp electrical power cables in the unit which may be electrically connected to a similar type connector through the portion 418.

What we claim is:

1. An electrical connector of the plug and receptacle type comprising a housing open at the top and having means for connection to a power supply line, a receptacle mounted in the housing and being formed with a flame tight compartment, a plurality of receptacle contacts extending from said compartment to the open side of the housing, switching mechanism mounted in said compartment and being operable to connect and disconnect said contacts to the power source, a plug adapted for insertion in the open side of the housing and having complemental contacts for engagement with said receptacle contacts, a shaft journaled in said plug for rotation and being operable upon rotation to actuate said switching mechanism into "on" and "off" positions, an operating handle carried by said plug, selective means for connecting said handle to said shaft, latch means operable to lock said shaft in the "on" position and release means operable independently of said handle to return said shaft to the "off" position, said plug and receptacle having means cooperable to prevent withdrawal of the plug from said housing when said switching mechanism is actuated to the "on" position.

2. An electrical connector of the plug and receptacle type comprising a housing open at one side, a plug adapted to be inserted in the open side of the housing, a receptacle unit mounted in the housing and being formed with a flame tight compartment, said plug and receptacle unit having complementary contacts for engagement upon insertion of the plug in said housing, said receptacle contacts extending into said compartment, said receptacle unit being provided with a second series of contacts fixedly mounted in said compartment in axially spaced relation from said first contacts and being connected to a power source, switching mechanism mounted in said compartment, a switch actuating shaft connected to said switch mechanism and extending through a wall of said compartment toward the open end of the housing, a shaft journaled in said plug and having a free rotating handle located exteriorly of the plug, means for selectively connecting said handle to said shaft for effecting oscillation of said shaft, the confronting ends of said shafts being provided with interlocking portions for the transmission of rotary motion from said plug shaft to said receptacle unit shaft for actuation of said switching mechanism to "on" and "off" positions, latch means carried by said plug to latch said shaft in the "on" position and release means operable independently of said handle to return said shaft to the "off" position.

3. A plug for use in connection with combination electrical switch and receptacle unit comprising a two-piece housing consisting of a body portion and a cover portion, a plurality of contacts mounted in circular fashion in said body portion, said body portion being formed with a skirt surrounding said contacts, said body being further formed with an opening to receive electrical conductors to be connected to said contacts, a shaft carried by said cover for engagement with switch operating mechanism in said switch and receptacle unit when said plug is inserted in said unit, said shaft terminating within said plug skirt in a central position to said contacts and extending through said cover, said shaft being selectively connected to a handle mounted for free rotation on the exterior of said cover, means for releasably locking said handle to said shaft whereby when said handle is connected to said shaft and oscillated between inoperative and operative positions said switch operating mechanism will be actuated, yieldable means normally urging said shaft to its inoperative position, means for fixing said shaft in its operative position and release means operable to return said shaft to said inoperative position by said yieldable means indpedently of said handle.

4. A combination switch and receptacle comprising a housing having a wiring opening to receive electrical conductor wires introduced into said housing, a cover mounted on said housing having a removable switch unit mounted in said cover, said unit comprising a cylindrical sleeve having a pair of partitions mounted therein forming an enclosed explosion proof chamber, a plurality of bridging contacts extending through one of said partitions from said chamber and electrically connected to said conductor wires, a plurality of receptacle contacts extending through the other of said partitions from said chamber, switch contacts mounted for oscillation in said chamber, switch contact operating mechanism extending out of said chamber including a shaft; a plug removably mounted in said switch unit; said plug having a plurality of plug contacts engaging said receptacle contacts, switch actuating mechanism carried by said plug including a shaft engageable with said shaft extending out of said chamber, whereby upon operation of said switch actuating mechanism carried by said plug said engaged shafts are oscillated to operate said switch contacts to connect said bridging contacts in circuit with said receptacle contacts whereby a circuit between said conductor wires and said plug contacts is completed.

5. An electrical connector comprising a housing mounted in a supporting surface, at least one conduit hub formed on said housing to receive a conduit carrying electrical connectors to be introduced into said housing, a plurality of fixed contacts mounted in circumferentially spaced relation on a platform positioned adjacent the bottom of said housing, said fixed contacts being adapted to be electrically connected to said conductors, a cover mounted on said housing, a combination switch and receptacle unit removably mounted on said cover and extending into said housing and terminating in spaced axial relation to said fixed contacts, said unit including a cylindrical sleeve having a pair of partitions mounted therein in axially spaced relation forming an enclosed chamber therebetween, a plurality of bridging contacts mounted in one of said partitions in circumferentially spaced relation complemental to the spacing of said fixed contacts, said bridging contacts extending axially through said partitions from said chamber and being electrically connected to said fixed contacts, a plurality of receptacle contacts mounted in said other partition in circumferentially spaced relation complemental to the spacing of said bridging contacts, said receptacle contacts being axially spaced from said bridging contacts in said chamber and extending through said partition and terminating in an exposed position in said cylindrical sleeve, a plurality of axially extending switch contacts mounted in said chamber in spaced relation to said bridging and receptacle contacts, said switch contacts being operable to electrically connect said receptacle and bridging contacts, a plug having a plurality of plug contacts, said plug being received in said cylindrical sleeve whereby said plug and receptacle contacts are electrically connected, means for operating said switch contacts so as to close the space between said switch contacts and said receptacle and bridging contacts in order to connect said fixed and plug contacts in circuit through said bridging, switch and receptacle contacts.

6. An electrical fitting for use in hazardous locations comprising a housing, a plurality of electrical conductors introduced into said housing through a conduit hub formed therein, a cover mounted on said housing, a combination switch and receptacle unit mounted in said cover, said unit comprising a cylindrical sleeve fixed to said cover, first and second partitions mounted in flame tight relation in said sleeve and forming an explosion proof chamber therein, a plurality of contacts extending axially through said partitions from the interior of said chamber and communicating exteriorly of said chamber with said electrical conductors and a plurality of plug contacts carried by a plug removably mounted in said sleeve, a shaft mounted for oscillation in said unit, said shaft extending through one of said partitions and being journaled in a bearing mounted therein, said shaft terminating in said chamber and journaled at its inner terminus in a bearing mounted in said other partition, a contact block fixed to said shaft for oscillation therewith in said chamber, said block being formed with a plurality of radial notches at a plurality of circumferentially spaced points about said block, a plurality of switch contacts yieldably mounted for limited circumferential movement in said notches said contacts being normally circumferentially spaced from said plurality of contacts extending through said partitions in said notches, the outer terminus of said shaft terminating in spaced relation to said sleeve, operating means carried by said plug for oscillating said shaft and being coupled thereto whereby upon actuation of said operating means said shaft is oscillated and said switch contacts are moved circumferentially to close the space between said switch contacts and said plurality of contacts extending through said partitions to connect said electrical conductors and plug contacts in circuit.

7. Claim 3 wherein said plug is provided with indicating means for indicating the position of said shaft in said plug and wherein said handle is normally urged out of connection with said shaft to permit free swinging of said handle whereby said indicating means will indicate the position of said shaft regardless of the position of said handle.

8. Claim 4, wherein means are provided for normally urging said switch contacts out of engagement with said bridging and said receptacle contacts and means are provided for limiting the movement of said switch contacts.

9. Claim 4, wherein said switch contacts are carried by a switch block provided with upper and lower recesses forming a plurality of radially extending barriers and a central barrier, a plurality of apertures extending through said central barrier to connect said recesses, said bridging and receptacle contacts extending into and terminating in said recesses, said switch contacts including a plurality of switch contact bars being removably mounted in said apertures for limited movement therein to connect said bridging and receptacle contacts in circuit when said block is rotated.

10. Claim 9, wherein one of said radial barriers is thickened to provide a striking surface for a pair of said bridging and receptacle contacts extending into said recesses adjacent said thickened barrier whereby to limit the rotation of said switch block.

11. Claim 9, wherein one pair of bridging and receptacle contacts are in the form of ground contacts and extend through one of said apertures in said block in electrical engagement at all times to provides a ground circuit for said unit regardless of the orientation of said block.

12. A combination receptacle and switch unit comprising a body open at one end and closed at its opposite end, an explosion proof switch compartment formed in said body, a plurality of bridging contacts extending out of the closed end of said body from said compartment, said bridging contacts adapted to be connected to a power supply, a plurality of receptacle contacts adapted to engage a plurality of plug contacts carried by a plug inserted in the open end of said housing, switch means mounted in said compartment, said switch means including a plurality of axially extending switch contacts for electrically connecting said bridging and receptacle contacts within said compartment whereby to connect said plug contacts to said power supply, and switch operating means extending out of said compartment for actuating said switch means.

13. The invention of claim 12 wherein said switch contacts are mounted on a switch block yieldably urged to a position where said switch contacts are spaced from said bridging and receptacle contacts, said switch block being mounted for oscillation on a shaft extending out of said compartment and said switch operating means being operable upon insertion of a plug in the open end of said housing to rotate said shaft and block to a position wherein said switch contacts engage said bridging and receptacle contacts.

14. A plug adapted to be inserted into a receptacle, a shaft carried by said plug for connection with switch operating means in said receptacle, said shaft being rotatable between "on" and "off" positions, a free rotating handle located exteriorly on said plug, selective means for interlocking said handle to said shaft to effect rotation of said handle between "on" and "off" positions, latch means for releasably locking said shaft in the "on" position and means operable when actuated to return said shaft to the "off" position independently of said handle.

References Cited in the file of this patent

UNITED STATES PATENTS

| | | |
|---|---|---|
| 1,498,361 | Douglas | June 17, 1924 |
| 1,677,783 | Kearney | July 17, 1928 |
| 1,684,356 | Mayer | Sept. 11, 1928 |
| 2,015,543 | Bissell | Sept. 24, 1935 |
| 2,259,359 | Thompson | Oct. 14, 1941 |
| 2,492,856 | Gates | Dec. 27, 1949 |
| 2,561,450 | Russell | July 24, 1951 |
| 2,576,527 | Matthysse | Nov. 27, 1951 |
| 2,588,632 | Jeffrey | Mar. 11, 1952 |
| 2,646,475 | Goodrich et al. | July 21, 1953 |
| 2,680,383 | Lahti | June 8, 1954 |
| 2,705,266 | Parish | Mar. 29, 1955 |
| 2,816,185 | Berticevich | Dec. 10, 1957 |
| 2,857,486 | Hubbell et al. | Oct. 21, 1958 |

FOREIGN PATENTS

| | | |
|---|---|---|
| 115,275 | Great Britian | May 6, 1918 |
| 521,486 | Belgium | Aug. 14, 1953 |